United States Patent [19]

Tylko

[11] Patent Number: 4,801,435

[45] Date of Patent: Jan. 31, 1989

[54] HYBRID PLASMA REACTOR

[75] Inventor: Jozef K. Tylko, Minneapolis, Minn.

[73] Assignee: Plasma Holdings N.V., Minneapolis, Minn.

[21] Appl. No.: 905,287

[22] Filed: Sep. 8, 1986

[51] Int. Cl.$^4$ .................... B01J 19/08; H05B 11/00; C22B 4/00; B21J 9/00

[52] U.S. Cl. .................... 422/186.04; 422/906; 75/10.19; 75/10.11; 573/22; 219/121.36; 219/121.48; 219/121.5; 219/121.51

[58] Field of Search .................... 422/906, 186.04; 219/121 P, 121 PM, 121 PP, 121 PQ; 373/11, 17, 18, 22, 23; 75/10.19, 10.11

[56] References Cited

U.S. PATENT DOCUMENTS

| | | | |
|---|---|---|---|
| 3,707,644 | 12/1972 | Hirt et al. | 219/121 P |
| 3,813,510 | 5/1974 | Hatch | 219/121 P X |
| 4,361,441 | 11/1982 | Tylko | 219/121 P X |
| 4,570,048 | 2/1986 | Poole | 219/121 PM X |

Primary Examiner—John F. Terapane
Assistant Examiner—Susan Wolffe
Attorney, Agent, or Firm—Kinney & Lange

[57] ABSTRACT

A low temperature plasma reactor for the treatment of particulate material. A housing is provided having an exit for treated material. Within the housing, the particulate material, and any desired additional reactants, undergo thermo-chemical reaction while being subjected to cyclonic action. The particulate material migrates or is driven toward the housing walls as it travels through the housing toward the housing exit. A plasma generator subjects that material that passes through the housing exit to plasma action. In a preferred embodiment, the housing includes a first portion wherein the cyclonic conditions are established, a throat portion through which treated material exits the housing and an adaptive portion extending between the first portion and the throat portion. An offgas duct withdraws gas and entrained particulate material generally at the junction of the first and adaptive housing portions while the plasma generator establishes a thermal barrier to the passage of entrained particulate material from the throat portion. The offgases may be employed in cogeneration while the inlet gases, by which cyclonic action is established, may have their constituents controlled with cogeneration in mind.

26 Claims, 2 Drawing Sheets

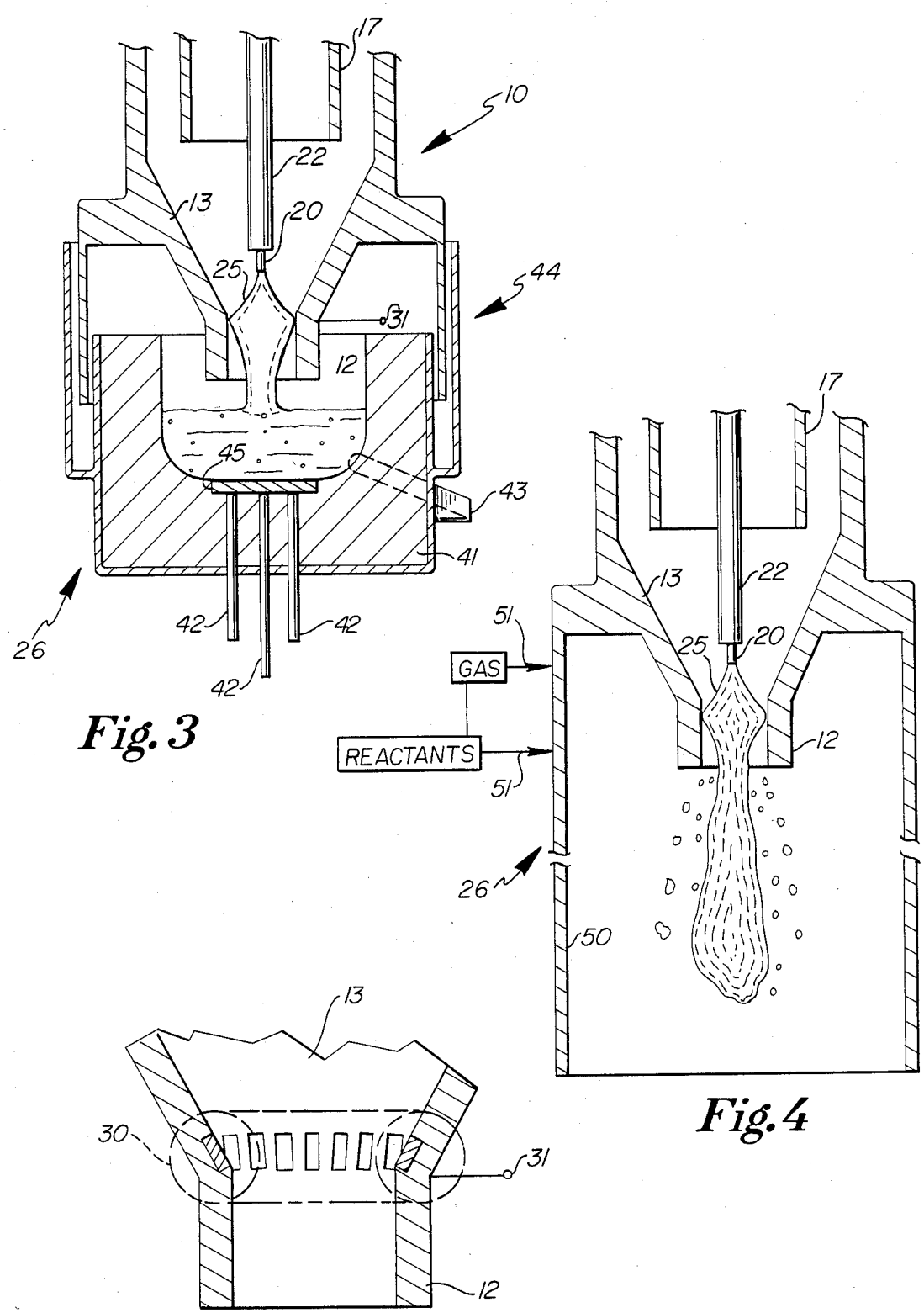

HYBRID PLASMA REACTOR

BACKGROUND OF THE INVENTION

1. Field of the Invention

The present invention relates generally to the treatment of particulate matter by low temperature plasma and, more particularly, to the combined treatment of particulate matter by thermo-chemical energy and plasma action within a common housing.

2. Description of the Prior Art

For the purposes of the present invention, plasma may be defined as defined in U.S. Pat. No. 4,361,441 which is commonly owned with the present specification and which is hereby incorporated by reference. As in the incorporated patent, the present invention relates to low temperature plasmas (an arbitrary reference to plasmas in which the temperature of a species is below 100,000° K.) and to the treatment of particulate material which includes treatment by such plasmas. In the context of the present invention, particulate material may be treated, inter alia, for the production of hot metal, the manufacture of hydraulic cements and glasses as well as for an environmentally acceptable recovery of energy from a variety of fuels and waste materials. The particulate material to be treated will depend on the particular application, including reactants desired for that application, and applications beyond those specifically discussed will be apparent to those familiar with their respective arts from the teachings contained herein.

The relatively high energy levels available from plasma have recognized value in the processing of many particulate materials. However, that energy level is relatively expensive to generate and control. Also, those energy levels are often necessary only during a portion of the processing. For example, in the reduction of iron ores (as in many other endothermic reactions) the early steps (e.g., the formation of Wustite) requires relatively small amounts of energy compared to the removal of the last oxygen to form iron. In such cases, treatment or processing entirely by plasma action, while having attributes which may not easily be attainable in other processes, is frequently viewed as wasteful in that the plasma action is not only applied at times when it is most desirable but also during other processing stages. In such cases, it is clearly desirable to employ thermo-chemical energy during the earlier, or less energy intensive, stages of the processing, while reserving the plasma energy for processing stages in which it is most useful.

While the desirability of combined thermo-chemical and plasma action for many processes would appear obvious, the implementation of their combined action has proved very troublesome. Principal among the troubles is the large volume of gases created during the thermo-chemical processing stages. These gases, which are largely combustion products, are generated by the material under process and occupy a volume which is large compared to the region or zone of plasma action. This large gas volume cannot efficiently be passed through the relatively small plasma action zone. Also, the prior art has not effectively separated the combustion gases from the material in process, especially when the later is present as submicron fumes.

SUMMARY OF THE INVENTION

The present invention provides a combined treatment by thermo-chemical energy and plasma action to particles introduced into a common housing. During the thermo-chemical treatment, the particles are subjected to cyclonic forces within the housing. This facilitates entry of the particles into the zone of plasma action while allowing a withdrawal of combustion gases from the housing without impeding the progress of the particles to the plasma action zone. The pretreated particles are subjected to the plasma action as they progress toward or pass through the housing exit. Combustion gases may be withdrawn in a region of the housing intermediate the housing portion wherein cyclonic conditions are established and the region or zone of plasma action. In this manner, the relatively high energy levels available as a result of the plasma discharge are available when they are most desirable while considerably cheaper thermo-chemical energy is employed for those processing stages not requiring the high plasma energy levels. Additionally, the combustion gases generated during the thermo-chemical processing may be withdrawn, wholly or partially, from the housing without passing through the plasma action zone and, accordingly, without undue heating of large volumes of gases in the plasma action zone.

While the mode of utilizing the present invention described to this point lends itself particularly well to the smelting of a variety of ferrous and non-ferrous ores and concentrates, other modes of utilization include inter alia, deslagging and desulfurizing coals in which the hybrid reactor of the present invention is used for the generation of clean combustible gases and may be used as a retrofit to a burner. For desulfurization, iron oxide or calcium oxide are introduced concurrently leading to the deslagging, the sulfur reporting to the slag. The present hybrid plasma reactor lends itself particularly well to the deslagging of high ash coals such as lignites or other low grade fuels and carbonaceous wastes by plasma augmented cyclonic action and the large thermophoretic effect resulting from the surface of the spinning expanded plasma column provides a very efficient collection of the fine particles which the cyclonic action cannot achieve below approximately 5 micrometers size. It is to be noted that the deslagging and desulfurization are carried out concurrently.

It also falls within the scope of the invention to treat various types of waste materials such as unsintered and sintered sludge which may be derived from burnt coal, sewage residues or other sources. Thus it may be said in general that the present hybrid plasma reactor lends itself to any pyro-process and, particularly, those that can profitably employ those advantageous features that a plasma expanded by orbiting and pulsating could convey to the entrained feedstocks.

In a preferred embodiment, the housing used in the practice of the present invention includes a first, cyclonic action portion and a throat portion through which treated material exits the housing. A plasma action zone generally includes the housing throat portion. In the illustrated embodiment, the housing portion intermediate the cyclonic action portion and plasma action zone is generally conical.

Particulate material to be treated (and other desired reactants), are introduced into the first housing portion and cyclonic action is established therein by a tangential introduction of an entraining volume of gas. The other desired reactants may include fuel, oxidants, additives, etc., as required or desired for the particular application. The particulate material and other reactants may be introduced tangentially to facilitate the development of the cyclonic action, non-tangentially, or both, and may be introduced at one or more levels of the first housing portion.

The thermo-chemical reaction within the cyclonic action housing region may be established in any known and desired manner, as by a flame or coil, for example. Combustion thus induced provides thermal energy for pretreatment of the particulate material (relative to its treatment by plasma action) while that material undergoes cyclonic action. The cyclonic action causes the particulate material to respond to centrifugal forces by migrating toward the housing wall as it travels downwardly (toward the housing exit) from its point of introduction into the housing.

As a result of the noted thermo-chemical initial treatment or pretreatment, the energy applied to the material in the plasma action zone can be more efficiently utilized to effect the desired reaction in the materials passing from the housing. In this manner, the energy available at the various zones of the housing more closely match the thermal requirements than is the case when a particulate material is subjected only, or initially, to plasma action. Also, while a common housing is employed for both the thermo-chemical and plasma treatments, the combustion gases resulting from the thermochemical reactions may be exhausted separately, wholly or partially, thereby reducing the volume of gas that would otherwise be heating during passage through the plasma action zone. These withdrawn or exhausted gases may be usefully employed as by preheating the particulate feedstock.

In practice, the expanded plasma discharge generated in the practice of the present invention will at least partially impinge on the throat portion of the housing. Accordingly, it is preferred that an electrode structure be positioned at the throat portion. In many instances, the material being treated will be semi-molten or molten as it enters or passes through the region of plasma action and will flow over the electrode structure. Thus, a moving protective coating is provided to the electrode structure. In one preferred embodiment, the present invention intentionally transfers a portion of the plasma discharge to a counter-electrode carried by the housing by incorporating it in the electrical circuit supplying the plasma. This counter-electrode is similarly protected by the moving molten material undergoing treatment.

In some preferred embodiments, the electrode structure may be employed to orbit the plasma discharge. A preferred system for producing an orbiting, and therefore expanded, plasma discharge is disclosed in the incorporated patent which also provides a pulsating discharge that may be advantageously employed in the context of the present invention.

In addition to the above, the orbiting cone of the expanded plasma provides a strong thermophoretic effect from its surface which is employed in the practice of the present invention. In the prior art (in the incorporated patent, for example) such phenomena are recognized as impeding the introduction of particulate materials into the plasma for treatment. However, in the practice of the present invention the greater part of the material is first treated by the thermo-chemical means (and partially by the radiation from plasma, in the lower portion of the cyclonic action), and is collected along the side walls of the housing by virtue of the cyclonic action. This belongs the bulk of the material into direct contact of plasma action, at the base of the expanded and orbiting plasma cone. Those particles that remain entrained within the gases in the lower portion of the cyclonic action housing portion (typically fine and ultrafine particulate material that does not respond to cyclonic action due to their small mass) are acted upon by virtue of thermophoresis and are driven to the wall of the housing where they coalesce with the bulk of the descending material which is typically liquid or semi-liquid. Thus a thermo- phoretic effect (which is based on a temperature gradient, e.g., cf. L. Talbot, R. K., Cheng, R. W., Schefer, D. R.; Willis, *Thermophoresis of Particles in a Heated Boundary Layer*, J. FLUID MECH. (1980), Vol. 101, part 4, pp. 737–58.) substantially removes the frequently troublesome and environmentally undesirable fine and ultrafine particles reporting them to the bulk of the molten mass, achieving thereby an efficient phase separation.

It should be noted that the offgases generated in prior art plasma treatment systems have been employed for cogeneration in other furnaces to counter the perceived energy "waste" of those prior art systems. The offgases withdrawn in the practice of the present invention may be similarly employed, and, indeed, may have their composition established for such purpose as by acting on the inlet gas constituents.

BRIEF DESCRIPTION OF THE DRAWINGS

FIG. 3 illustrates a preferred embodiment of a portion of the reactor illustrated in FIG. 1, used in partially transferred use mode.

FIG. 4 is a further preferred embodiment for a portion, of the embodiment illustrated in FIG. 1, operating in a non-transferred mode.

FIG. 5 is a specific embodiment of an electrode structure that may be employed in the context of the embodiment of FIG. 1, to act as a segmented counter-electrode.

DETAILED DESCRIPTION OF THE PREFERRED EMBODIMENTS

Figures 1, 2:
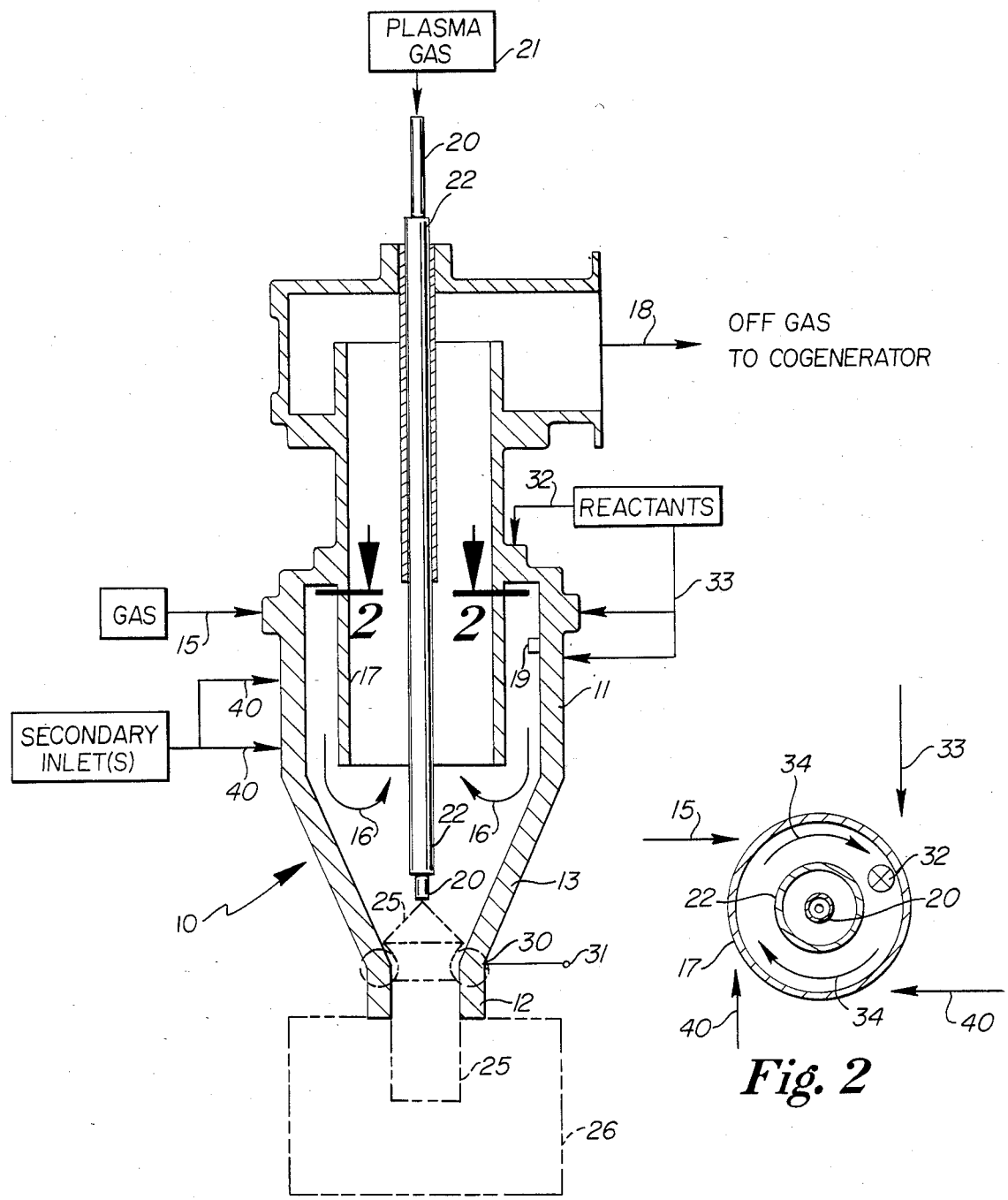
FIG. 1 is a cross sectional view of a plasma reactor in accordance with the present invention.
FIG. 2 is a cross sectional view of the plasma reactor of FIG. 1 taken along the line 2—2 in FIG. 1.

FIG. 1 illustrates a cross section of a plasma reactor in accordance with the present invention designated generally at 10. The housing includes a first generally cylindrical portion 11, a throat portion 12 and a generally conical, adaptive portion 13 extending between portion 11 to the throat 12. The cylindrical portion 11 defines an area or zone of cyclonic action (described more fully below) while the interior of the throat 12 is contained within an area of plasma action (also described more fully below). The conical portion 13 acts as an adaptor to direct material from the portion 11 to the throat 12 and is configured accordingly.

Cyclonic action is established within the housing portion 11 by a gas which is introduced tangentially into the housing portion 11 as indicated by the arrow 15 (see also FIG. 2). The cyclonic action establishing gases introduced at 15 travel downwardly through the housing toward the throat 12 and undergo a direction change, as indicated by the arrow 16, to travel upwardly through a duct 17. These gases exiting the housing through duct 17 (offgases herein) may be exhausted or, alternatively, may be conducted for further processing for for use in cogeneration where their thermochemical properties may be usefully employed, all as represented by the arrow 18. To facilitate the use of the offgases for cogeneration, or to accomodate particular requirements of the cogeneration process, the constituents introduced into the housing 10 may be enhanced or modified in ways not detrimental to the basic system requirements—as by enhancing the oxygen content of the gas input at 15, for example.

In the illustrated embodiment, a plasma generator includes a hollow graphite cathoie 20 which is electrically insulated from the rest of the reactor structure and through which plasma forming gases may be fed as indicated at 21, with or without small quantities of entrained solids (the solids being used for the modification of slag fluidity, desulfurization, etc., for example). The cathode 20 which may be in the form of a hollow rod-shaped conductor or comprise a constricted arc plasmatron (another type of plasma generator) is mounted slidably in a cooled cathode sheath 22, the cathode assembly extending through the duct 17 into the reactor chamber with the cathode 20 being exposed at the vicinity of the junction between the conical portion 13 and throat portion 12 of housing 10. As described more fully below, the dotted line 25 extending from the cathode 20 to the general area of the junction between the conical portion 13 and throat portion 12 of housing 10 and through and past the throat portion 12 define an area of plasma action (a plasma action zone) for an expanded plasma, the extent of the plasma action zone being determined by the nature of the plasma discharge, whether or not it is a transferred plasma and whether counter electrodes are employed. From a practical standpoint, there will be some discharge extending between the cathode 20 and the vicinity of the junction between the conical portion 13 and throat 12 such that the plasma action zone 25 will include the inner opening of throat portion 12 which will therefore constitute a counter-electrode.

Establishment and maintenance of a plasma discharge employing a simple plasma generator of the type illustrated in FIG. 1 is known to the prior art. As noted above, a current transfer from the plasma arc or discharge to the housing walls is likely. So long as this transfer is a small fraction of the total, and is uniformly distributed along the walls with the reactor, the transfer action is desirable. However, a localized transfer could be catastrophic. To protect against this, a current detector may be employed between the cathode 20 and the housing shell to switch off the plasma arc at a preset current value and to subsequently adjust the operating parameters to avoid formation of such arcs. However, so as to take advantage of such arcs, and their contribution to the overall effects of the reactor of the present invention, an electrode structure is preferrably positioned in the general region indicated by the dotted annular ring 30, isolated electrically from the rest of the structure and suitably controlled by establishing an appropriate potential between the cathode and the said electrode structure, as represented by the terminal 31. Particular electrode structures may be any known to the prior art including those discussed more fully below. For the purposes of the immediate discussion, however, an electrode structure in the region represented by the dotted oval 30 is generally annular (which is intended to include segmented) and may be water cooled and formed of a nonferromagnetic material.

Further, it is desirable that the plasma discharge orbits so as to minimize localized effects. This can be accomplished in any known manner. Indeed, the rotation of the cyclonic action established within the housing does facilitate smooth gliding of the arc roots on the surface of the electrode structure, thus preventing it from puncturing due to localized arc action.

Reactants, including the particulate material to be treated, are introduced into the housing 10 as indicated by the arrows 32 and 33. Arrow 32 represents a reactant introduction in which the direction of introduction is noncritical while arrow 33 represents a tangential introduction at varying heights within the housing, the tangential introduction represented by arrow 33 contributing to (or at least being in the general direction of) the circular motion initiated by the tangential introduction of gas at 15. The circular motion of the gas flow in housing portion 15 is represented by the arrows 34 in FIG. 2. In either method of reactant introduction, or if both are used, the circular motion of the gas flow within the portion 11 of housing 10 will subject the particles to cyclonic action causing them to migrate toward the housing wall, the limit of such action as is well-known, being limited to particles approximately larger than 5 micrometers.

In the practice of the present invention, thermal energy is provided to the internal chamber of the housing 10 in any desired manner such that thermo-chemical reactions (dependent upon the properties of the reactant particles) are induced within the particles during the time that they are undergoing cyclonic action. In FIG. 1, the mechanism for providing thermal energy is represented at 19 which may be a flame or ignition coil. As the particles move downwardly through the housing 16 a variety of reactions may take place, usually forming gaseous and solid products, which melt fully or partially on their descending spirally path, agglomerating and/or coalescing along the housing wall forming a descending molten film. Those fine particles that remain entrained are acted upon by the previously mentioned thermophoresis which acts to form a thermal barrier to entry of those particles into the plasma action zone as it drives those particles toward the housing wall.

Thus, as is apparent from the above discussion, the particles introduced at 32 and/or 33 are pretreated within the housing 10 by both cyclonic action and thermo-chemical reaction with their pretreated state being such that they can optimally employ the high energy available within the plasma action region 25. Additional reactants and/or gas may be injected into the housing 10 via secondary inlets represented by the arrows 40. Preferably, such secondary injections are tangential as indicated by the tangential relationship of the arrows 40 in FIG. 2. Particulate matter may also be introduced downstream with plasma (forming) gas 21, or through a duct concentric with the duct for the plasma (forming) gas 21.

External to housing 10 is a region of continuing treatment represented by the dotted line 26. As illustrated in FIG. 1, the plasma action zone 25 may extend into this region of continuing treatment 26 with the plasma discharge being transferred, nontransferred or partially transferred, with or without a counter electrode structure 31, dependent upon the particular application and the desired characteristics of the treatment within the plasma action zone 25. Where a nontransferred mode is employed, zone 25, comprises the so-called "plasma tailflame" ejected by gas dynamic forces, while in the case of partially or fully transferred mode, this region contains typically an expanded, bell-shaped plasma column terminating at the surface of a molten pool (of metal, for example). Specific continuing or ongoing treatments, as represented by the dotted line 26, are illustrated in FIGS. 3 and 4.

FIG. 3 illustrates a continuing treatment having particular utility in the production of hot metal and which, with suitable modification, may be useful in glass production. In the hot metal mode, the continuing treatment region designated generally at 26 includes a crucible or other type of collector whose general design and requirements are well known to those familiar with hot metal production. In particular, the general configuration illustrated in FIG. 3 may be employed in the smelting of ores (including the smelting of iron ore concentrates as well as nonferrous ores and ores of refractory metals), in the production of alloys as well as in the production of "hard metals" such as carbides, borides and nitrides and other interstitial compounds. As illustrated, anode connections 42 (for anode plate electrodes 45 exposed to the melt) are provided (suitably cooled) along with a means for tapping the melt, as at 43. In the alternative, collectors or crucibles allowing for tilting or batch continuous melting may also be utilized. A slidable gas seal, designated generally at 44, may be provided, in known manner.

A variant to the crucible illustrated in FIG. 3 may be employed in the production of glasses. In the hot metal embodiment illustrated in FIG. 3, the plasma arc is transferred to the hot metal melt. With glasses, it is necessary to extend the anodes, from the anode connections 42, through the melt and to disburse the same within the melt to provide uniform heating therein. Such anode extension and placement is familiar to those knowledgeable in the art. Weir-type configurations which are well known in the glass making art may also be employed, while glass forming feedstocks and fuel-/oxidant mixtures may be introduced tangentially either at the same level of the housing 11 or, alternatively, different glass forming constituents may be introduced at different levels according to their melting abilities.

FIG. 4 illustrates a fall chamber forming the continuing treatment region designated generally at 26. As illustrated, a nontransferred expanded orbiting arc extends through the throat portion of housing 10 and into the fall chamber 50 to continue the treatment of the material passing through the throat 12 of housing 10. Also as illustrated, fluids may be injected tangentially into the fall chamber 50, as at 51, to establish or maintain cyclonic conditions within the fall chamber 50, or centripetally to cause turbulence and to effect, where necessary, rapid quenching. Such fluid injection may be at multiple levels within the fall chamber 50 while additional reactants may also be injected into the fall chamber 50 for interaction within the continuing treatment region 26.

FIG. 5 illustrates a segmented electrode positioned within the region defined by the dotted line 30 (see also FIG. 1). From its position, it can be seen that any annular electrode positioned within the region 30 will be "coated" by flowing material as it passes through the entry opening and to the exit of throat 12. As noted, this coating helps to preserve the electrode structure. The region of dotted line 30 (see FIGS. 1 and 5) will preferably contain an electrode structure in all of the illustrated and/or discussed embodiments. In those embodiments employing a transferred plasma discharge (i.e., the molten product serving as the anode) the electrode structure may be biased with a potential between that of the cathode and workpiece to serve as a counter electrode.

Erosion of the counter electrode structure results from the fact that, with a direct current source, a substantially larger amount of thermal energy is dissipated at the anode than at the cathode and from hotspots resulting from point attachments of the discharge (often referred to as "arc roots"). To further counter such anode erosion, the plasma arc generated in the implementation of the present invention is orbited at the counter electrode, as disclosed in U.S. Pat. No. 4,394,162. The teachings of these referenced prior art materials are incorporated herein by reference with the incorporated United States patent specification providing the preferred mode of operation.

Obviously, many modifications and variations of the present invention are possible in light of the above teachings. For example, the plasma generator which forms a part of the present invention may operate in a nontransferred, partially transferred or fully transferred mode, dependent upon the particular application and its requirements. In practice, a partial transfer (generally at the entrance or entry opening to the throat portion 12 of housing 10) will occur. The flow of material being treated over this structure will provide a protective coating from errosion that might otherwise result. A specific electrode structure may be provided at the entry to the throat portion 12 and, with a partially transferred discharge, that electrode structure may serve as a counter electrode—an anode operating at a potential between the potential of the plasma generator cathode and primary anode.

The present invention may be employed as a retrofit for coal burners for the efficient deslagging and removal of sulfur from sulfurous coals whose commonly used desulfurizing agents such as lime or, preferably, iron oxides, are injected into the reactor resulting in the transfer of sulfur into calcareous or ferruginous slags, leaving a clean combustible gas.

Indeed, the potential applications for the present invention are many and varied and include:

1. Hot metal production (ferrous and non-ferrous, and their alloys);
2. Ferroalloys—in particular ferrosilicon; ferrochromium; ferrovanadium, silicomanganese, etc.;
3. Wide range of hydraulic cements and pozzolanas;
4. A variety of high purity interstitial compounds in a range of allotropic modifications and amorphous states;
5. Deslagging with simultaneous desulfurization of coals resulting in clean combustible gases and environmentally stable easily disposable solids;
6. Treatment for a variety of wastes such as town wastes, sewage wastes, unsintered and sintered sludges, coal wastes, etc.; and
7. Plasmo-thermal reduction of refractory oxides such as alumina and magnesia with the production of their respective metals and alloys.
8. Recovery of metallic values, typically lead and zinc, from accumulated slags or other wastes or by products.
9. As an aid to hydrometallurgy as by modification of feedstock.

Finally, other cyclone configurations may be applied in the practice of the present invention with internal or external passes, or combinations thereof. It is therefore to be understood that, within the scope of the appended claims, the invention may be practiced otherwise than as specifically described.

What is claimed is:

1. A low temperature plasma reactor for the treatment of particulate material which comprises:
   housing means including a first portion, a throat portion through which treated material exits the housing and an adaptive portion extending between the first portion and throat portion;
   feed means for introducing reactants, including at least the particulate material, into the housing means for thermo-chemical treatment within said first housing portion;
   means for establishing cyclonic conditions and subjecting said introduced reactants to cyclonic action within said first housing portion and including gas inlet means;
   offgas duct means for withdrawing gas generally at the junction of said first and adaptive housing portions;
   means for inducing a thermo-chemical reaction between the reactants within said first housing portion; and
   plasma generator means for subjecting at least that material exiting said housing through said throat portion to plasma action.

2. The plasma reactor of claim 1 wherein said plasma generator means comprises means for establishing a thermal barrier to the passage of entrained particulate matter from said throat portion.

3. The plasma reactor of claim 1 wherein said reactants comprise fuel.

4. The plasma reactor of claim 3 wherein said reactants further comprise additives.

5. The plasma reactor of claim 3 wherein said reactants further comprise oxidants.

6. The plasma reactor of claim 1 wherein the region generally at the junction of said throat portion and said conical section comprises counter electrode means, said plasma generator means and counter electrode means establishing a plasma discharge therebetween.

7. The plasma reactor of claim 1 further comprising continuing treatment means positioned outside said housing, and at the exit of said throat means, for continuing the treatment of said material by plasma action resulting from a plasma discharge established by said plasma generator means.

8. The plasma reactor of claim 7 wherein said continuing treatment means comprises means for collecting said material at the exit of said throat portion.

9. The plasma reactor of claim 8 further comprising anode means within said collecting means, said anode means and plasma generator means establishing a plasma discharge therebetween.

10. The plasma reactor of claim 9 wherein the region generally at the junction of said throat portion and said conical portion comprises counter electrode means, said plasma generator means and counter electrode means establishing a plasma discharge therebetween.

11. The plasma reactor of claim 7 wherein said continuing treatment means comprises fall chamber means.

12. The plasma reactor of claim 1 wherein said gas inlet means comprises primary and secondary inlet means spaced from each other along said cyclonic action within said first housing portion.

13. The plasma reactor of claim 1 wherein said feed means comprise at least first means for introduction of said particulate material and second means for additional reactants introduction.

14. The plasma reactor of claim 13 wherein said reactants comprise fuel.

15. The plasma reactor of claim 14 wherein said reactants further comprise additives.

16. The plasma reactor of claim 14 wherein said reactants further comprise oxidants.

17. The plasma reactor of claim 6 wherein said counter electrode means comprises generally annular electrode means.

18. The plasma reactor of claim 17 wherein said generally annular electrode means comprises segmented electrode means for orbiting of said plasma discharge.

19. The plasma reactor of claim 1 wherein said plasma generator means comprises means for establishing a plasma discharge that is at least partially transferred.

20. The plasma reactor of claim 19 wherein said plasma generator means further comprises means for orbiting said transferred plasma discharge.

21. The plasma reactor of claim 7 wherein said continuing treatment means comprises material collection means.

22. The plasma reactor of claim 21 wherein said material collection means comprises electrode means for at least partially transferring said plasma discharge.

23. The plasma reactor of claim 7 wherein said continuing treatment means comprises fall chamber means.

24. The plasma reactor of claim 23 further comprising means for inducing cyclonic action within said fall chamber means.

25. The plasma reactor of claim 1 further comprising means for providing oxygen enriched gas at said gas inlet means, said offgas duct means being adapted for connection to cogeneration means.

26. The method of treating particulate material comprising the steps of:
   feeding the particulate material into a housing;
   pretreating the material within a first housing portion by cyclonic action within a flow of combustion gas to which any desired reactants are added;
   withdrawing at least a portion of the offgas resulting from said pretreatment, including entrained particles;
   subjecting the pretreated material to plasma action within a second housing portion while establishing a thermal barrier to passage of entrained particles from said second housing portion; and
   continuing the treatment of said material outside of said housing at least in part through plasma action resulting from a plasma arc originating within said housing.

* * * * *